(12) United States Patent
Schröter et al.

(10) Patent No.: US 6,520,552 B2
(45) Date of Patent: Feb. 18, 2003

(54) BUMPER FOR A MOTOR VEHICLE

(75) Inventors: Martin Schröter, Bielefeld (DE); Wilhelm Arns, Paderborn (DE)

(73) Assignee: Benteler Automobiltechnik GmbH & Co KG, Paderborn (DE)

( * ) Notice: Subject to any disclaimer, the term of this patent is extended or adjusted under 35 U.S.C. 154(b) by 0 days.

(21) Appl. No.: 10/001,888

(22) Filed: Nov. 16, 2001

(65) Prior Publication Data

US 2002/0084659 A1 Jul. 4, 2002

(30) Foreign Application Priority Data

Nov. 17, 2000 (DE) ......................................... 100 57 311

(51) Int. Cl.⁷ .............................................. B60R 19/26
(52) U.S. Cl. ..................... 293/132; 293/120; 293/121; 293/134
(58) Field of Search ................................ 293/132, 120, 293/133, 102, 155, 122, 136, 121; 296/188, 185; 280/784

(56) References Cited

U.S. PATENT DOCUMENTS

| | | | | |
|---|---|---|---|---|
| 3,599,757 A | | 8/1971 | Masanobu | |
| 3,734,554 A | * | 5/1973 | Schwabenlender | 293/136 |
| 3,779,592 A | * | 12/1973 | Golze et al. | 293/120 |
| 3,782,769 A | * | 1/1974 | Fader et al. | 293/134 |
| 3,827,740 A | * | 8/1974 | Golze et al. | 293/120 |
| 3,844,544 A | * | 10/1974 | Keilholz | 293/134 |
| 3,881,760 A | * | 5/1975 | Hutai | 293/135 |
| 3,897,095 A | * | 7/1975 | Glance et al. | 293/120 |
| 4,027,909 A | * | 6/1977 | Hauraux et al. | 293/136 |
| 4,348,042 A | * | 9/1982 | Scrivo | 293/120 |
| 4,350,378 A | * | 9/1982 | Wakamatsu | 293/120 |
| 4,372,701 A | * | 2/1983 | Watanabe | 293/121 |
| 4,386,799 A | * | 6/1983 | Molnar | 293/120 |
| 4,408,790 A | * | 10/1983 | Shimoda et al. | 293/132 |
| 4,482,180 A | * | 11/1984 | Huber et al. | 293/120 |
| 4,765,665 A | * | 8/1988 | Akahoshi | 293/121 |
| 5,100,187 A | * | 3/1992 | Loren | 293/122 |
| 5,154,462 A | * | 10/1992 | Carpenter | 293/120 |
| 5,201,912 A | * | 4/1993 | Terada et al. | 293/132 |
| 5,611,568 A | * | 3/1997 | Masuda | 280/784 |
| 5,876,078 A | * | 3/1999 | Miskech et al. | 293/132 |
| 5,924,765 A | * | 7/1999 | Lee | 296/189 |
| 5,988,713 A | * | 11/1999 | Okamura et al. | 293/120 |
| 6,059,331 A | * | 5/2000 | Mori | 293/132 |
| 6,325,431 B1 | * | 12/2001 | Ito | 293/120 |
| 6,398,275 B1 | * | 6/2002 | Hartel et al. | 293/120 |
| 2002/0079711 A1 | * | 6/2002 | Kajiwara et al. | 293/133 |

FOREIGN PATENT DOCUMENTS

DE    42 38 631 A1    5/1994

* cited by examiner

Primary Examiner—Kiran Patel
(74) Attorney, Agent, or Firm—Henry M. Feiereisen

(57) ABSTRACT

A bumper for a motor vehicle; includes a cross member having an U-shaped cross section and intended for attachment to longitudinal members of a vehicle chassis. The cross member includes a web and two legs connected to the web. Received in the cross member is an impact absorber which has a cross member proximal end joined to the web and to confronting ends of the legs.

13 Claims, 1 Drawing Sheet

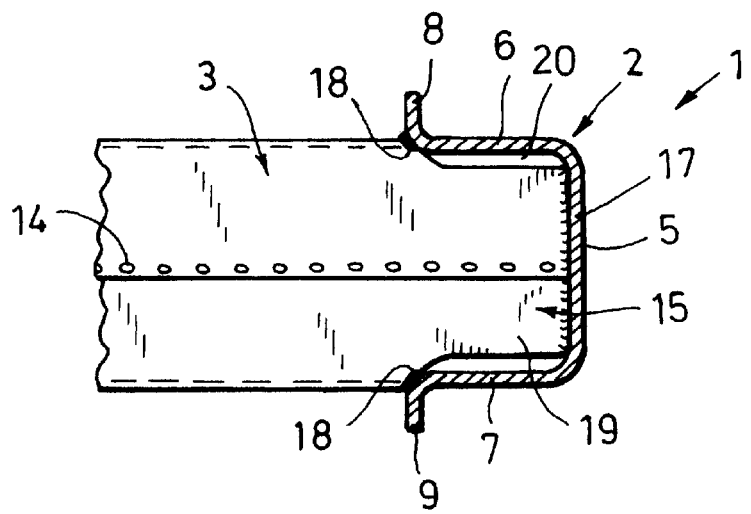
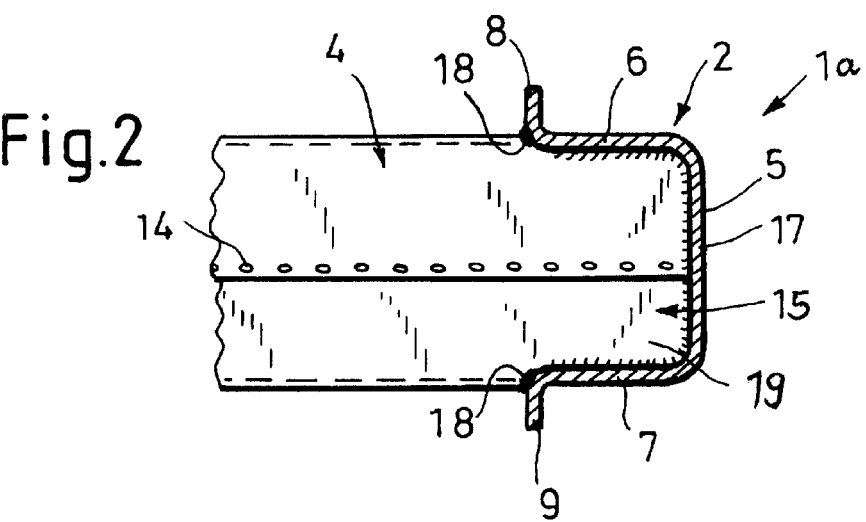
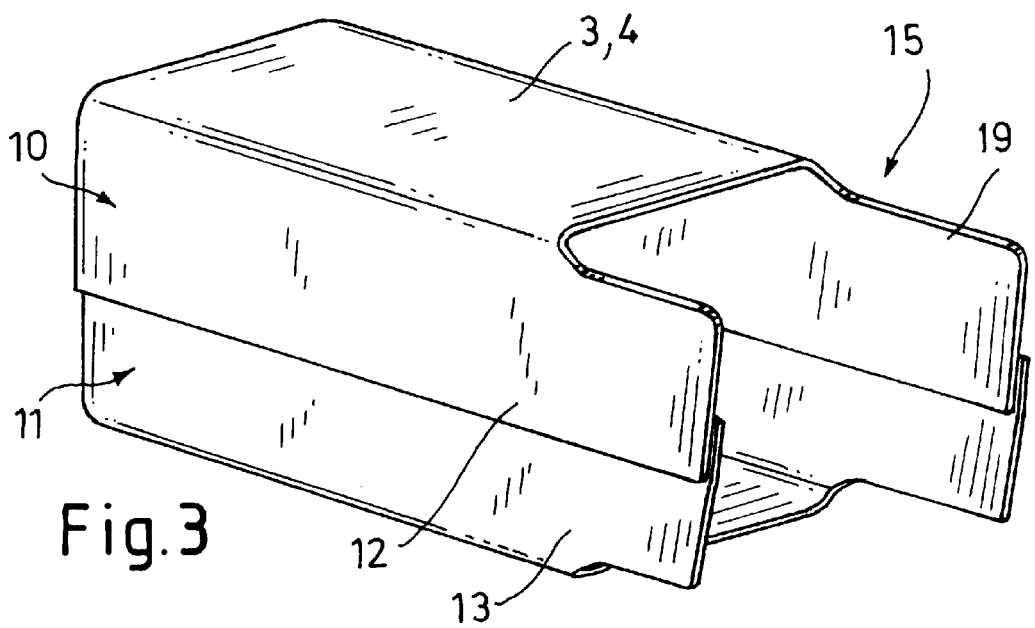

BUMPER FOR A MOTOR VEHICLE

CROSS-REFERENCES TO RELATED APPLICATIONS

This application claims the priority of German Patent Application Serial No. 100 57 311.8, filed Nov. 17, 2000, the subject matter of which is incorporated herein by reference.

BACKGROUND OF THE INVENTION

The present invention relates, in general, to a bumper for a motor vehicle, and in particular to a bumper of a type having an U-shaped cross member for attachment to longitudinal members of a vehicle chassis, wherein the cross member includes a web and two legs connected to the web.

Bumpers are arranged across the front and rear of a motor vehicle between the plastic casing, forming an end piece of the body, and the chassis of the motor vehicle, and are provided to prevent damage in the event of a low speed impact. Oftentimes, impact absorbers, so called crash boxes, are disposed between the cross member and the longitudinal members, to absorb the energy in the event of a collision by converting the impact energy into deformation work.

German Pat. No. DE 42 38 631 A1 describes a bumper assembly with an impact absorber made of an inner tube and an outer tube, which move into one another in the event of a collision. The inner tube is secured to the legs of the cross member. This bumper assembly suffers shortcomings as a result of its weight and complex construction.

U.S. Pat. No. 3,599,757 discloses various embodiments of impact absorbers.

An impact absorber is also known which has a rectangular construction and is composed of an upper shell element and a lower shell element. The shell elements have a U-shaped profile and are joined together. The cross member proximal end is either secured to the web of the cross member or to the ends of the lateral legs. This area, however, represents a potential weak spot because a deformation of the bumper may result in a separation of the joint between the impact absorber and the cross member.

It would therefore be desirable and advantageous to provide an improved bumper which obviates prior art shortcomings and includes a cross member of enhanced rigidity and increased mechanical stability.

SUMMARY OF THE INVENTION

According to one aspect of the present invention, a bumper for a motor vehicle; includes a cross member having a U-shaped cross section and intended for attachment to longitudinal members of a vehicle chassis, wherein the cross member includes a web and two legs connected to the web; and an impact absorber received in the cross member and having a cross member proximal end joined to the web and to confronting ends of the legs.

The present invention resolves prior art problems by joining the impact absorber with its cross member proximal end on the inside to the web of the cross member as well as to the area of the ends of the legs. Suitably, the joint between the impact absorber and the cross member is implemented through a welding process.

Practice has shown that a bumper according to the present invention exhibits significantly higher capability of absorbing energy because the cross member is considerably reinforced and stiffened as a consequence of the connection with the impact absorber. Moreover, the joint is secured to a greater extent from separation, in particular as a result of the welded seams, even when the bumper is subjected to extreme deformations, e.g. in the event of high-speed collisions.

The connection between the impact absorber and the cross member is established by a first joint in substantially parallel relationship to the web as well as by a second joint which extends transversely to the first seam at the end of the legs. This type of connection implemented at least in two planes ensures a high stiffness and mechanical stability.

According to another feature of the present invention, the legs of the cross member may be continued at their ends by flanges which further enhance the rigidity of the cross member. Depending on requirements at hand, the flanges may be turned inwardly or outwardly with respect to the cross member, with the impact absorber exhibiting a complementary configuration when joined to the cross member.

According to another feature of the present invention, the impact absorber may be formed at the cross member proximal end with lateral lobes in spaced-apart relationship to the legs. In this way, weight can be saved, and a fabrication may be implemented more efficiently.

According to another feature of the present invention, the impact absorber may be formed at the cross member proximal end with lateral lobes that are joined with the legs. This construction results in even higher rigidity and stability, which is desired especially when heavy vehicles are involved. Suitably, the cross member proximal end of the impact absorber is joined all-round with the cross member. Of course, joining may be implemented also along partial sections about adjoining cross sectional areas.

The impact absorber involved here has a hollow box-like structure (crash boxes) and may be made of two shell elements representing an upper and a lower shell element. The upper and lower shell elements are joined at the longitudinal edges of their lateral skirts. At their side proximate to the longitudinal members, the shell elements normally have an attachment flange for connection to the longitudinal members.

BRIEF DESCRIPTION OF THE DRAWING

Other features and advantages of the present invention will be more readily apparent upon reading the following description of preferred exemplified embodiments of the invention with reference to the accompanying drawing, in which:

FIG. 1 is a simplified, partially sectional view of a first embodiment of a bumper according to the present invention;

FIG. 2 is a simplified, partially sectional view of a second embodiment of a bumper according to the present invention; and FIG. 3 is a perspective illustration of an impact absorber for incorporation in the bumper in accordance with the present invention.

DETAILED DESCRIPTION OF PREFERRED EMBODIMENTS

Throughout all the Figures, same or corresponding elements are generally indicated by same reference numerals.

Turning now to the drawing, and in particular to FIG. 1, there is shown a simplified, partially sectional view of a first embodiment of a bumper according to the present invention, generally designated by reference numeral 1 and configured for attachment to a, not shown, motor vehicle. The bumper 1 includes a cross member, generally designated by reference numeral 2 and extending transversely to, not shown, longitudinal members of the motor vehicle. Integrated between the longitudinal members and the cross member 2 is an impact absorber 3, also called crash box, to absorb the energy in the event of a collision by converting impact energy into deformation work.

At least over a major part of its length, the cross member 2 has a configuration which is open toward the impact absorber. The cross member 2 is formed as a shell construction having a U-shaped cross section with a front web 5 and two legs 6, 7. i.e. upper leg 6 and lower leg 7, which are connected to the web 5, respectively, and terminate in outwardly directed flanges 8, 9. In the nonlimiting example of FIG. 1, the flanges 8, 9 are directed outwardly. Of course, the flanges may also be turned inwardly if requirements dictate such a configuration.

The impact absorber 3 has a cross member proximate end 15 which is joined by a welding seam 17 to the inside of the web 5 of the cross member 2 and by a welding seam 18 to the ends of the legs 6, 7. The cross member proximate end 15 of the impact absorber 3 is recessed inwards and has lobes 19 extending at a distance to the legs 6, 7 in such a manner that a void 20 is defined between the legs 6, 7 and the lobes 19. As shown in FIG. 1, the impact absorber 3 is connected to the cross member 2 at the end face of the lobes 19 by the welding seam 17 and at the juncture to the legs 6, 7 to the flanges 8, 9 by the welding seam 18 which extends into the drawing plane.

FIG. 2 shows a simplified, partially sectional view of a second embodiment of a bumper according to the present invention, generally designated by reference numeral 1a. Parts corresponding with those in FIG. 1 are denoted by identical reference numerals and not explained again. In this embodiment, the bumper 1a has an impact absorber 4 which differs from the impact absorber 3 of the bumper 1 by the fact that the cross member proximal end 15 is recessed inwardly in a way that the lobes 19 extend adjacent the legs 6, 7 and are joined to the legs 6, 7. In this way, the welding seam 17 extends from the web 5 also along the legs 6, 7. Of course, it is certainly conceivable to breach the welding seam 17 so as to extend only along predetermined sections between the impact absorber 4 and the cross member 2.

Turning now to FIG. 3, there is shown a perspective illustration of the impact absorber 3 or 4 for incorporation in the bumper 1 or 1a, respectively. The impact absorbers 3, 4 are each composed by way of a shell construction comprised of complementing upper shell element 10 and lower shell element 11. The shell elements 10, 11 have lateral skirts 12, 13 and are so positioned that the skirts 12, 13 overlap one another and are joined together by a welding seam 14 produced by rollers, as indicated in FIGS. 1 and 2.

While the invention has been illustrated and described as embodied in a bumper for a motor vehicle, it is not intended to be limited to the details shown since various modifications and structural changes may be made without departing in any way from the spirit of the present invention.

What is claimed as new and desired to be protected by letters patent is set forth in the appended claims:

What is claimed is:

1. A bumper for a motor vehicle; comprising:

a cross member having a U-shaped cross section and intended for attachment to longitudinal members of a vehicle chassis, wherein the cross member includes a web and two legs connected to the web; and an impact absorber received in the cross member and having a cross member proximal end joined to the web and to confronting ends of the legs.

2. The bumper of claim 1, wherein the legs have web distal ends, said cross member including two flanges, each of the flanges being connected to the legs, whereby the flanges and the legs are placed into one-to-one correspondence.

3. The bumper of claim 1, wherein the impact absorber is formed at the cross member proximal end with lateral lobes in spaced-apart relationship to the legs.

4. The bumper of claim 1, wherein the impact absorber is formed at the cross member proximal end with lateral lobes joined with the legs.

5. The bumper of claim 1, wherein the impact absorber is made of two shell elements.

6. The bumper of claim 1, wherein the cross member proximal end of the impact absorber is welded to the web and the ends of the legs.

7. A bumper for a motor vehicle; comprising:

a cross member for attachment to longitudinal members of a vehicle chassis, said cross member including a web and two legs connected to the web; and an impact absorber received in the cross member and having a cross member proximal end which is inwardly recessed for connection to an inside wall surface of the web by a first joint and to confronting ends of the legs by a second joint, wherein the second joint is oriented transversely to the first joint.

8. The bumper of claim 7, wherein the legs have web distal ends, said cross member including two flanges, each of the flanges being connected to the legs, whereby the flanges and the legs are placed into one-to-one correspondence.

9. The bumper of claim 8, wherein the flanges are turned outwards or inwards.

10. The bumper of claim 7, wherein the cross member proximal end has lateral lobes extending at a distance to the legs to thereby define a void therebetween.

11. The bumper of claim 7, wherein the cross member proximal end has lateral lobes extending adjacent the legs, wherein the first joint is extended to join the lobes with the legs.

12. The bumper of claim 7, wherein the impact absorber is made of an upper shell element and a lower shell element which overlap one another along their confronting longitudinal edges, wherein the overlapping longitudinal edges of the upper and lower shell elements are joined together.

13. The bumper of claim 7, wherein the first and second joints are realized by a welding process.

* * * * *